US006203919B1

(12) United States Patent
Takebe et al.

(10) Patent No.: US 6,203,919 B1
(45) Date of Patent: Mar. 20, 2001

(54) INSULATING FILM AND METHOD FOR PREPARING THE SAME

(75) Inventors: Yasuo Takebe, Katano; Tadashi Ootake, Neyagawa; Norihisa Mino; Hiroaki Takezawa, both of Nara, all of (JP)

(73) Assignee: Matsushita Electric Industrial Co., Ltd., Osaka-Fu (JP)

( * ) Notice: Subject to any disclaimer, the term of this patent is extended or adjusted under 35 U.S.C. 154(b) by 0 days.

(21) Appl. No.: 08/980,749

(22) Filed: Dec. 1, 1997

(30) Foreign Application Priority Data

Dec. 19, 1996 (JP) ........................................ 8-339756

(51) Int. Cl.[7] .......................... B32B 15/08; B32B 27/00

(52) U.S. Cl. ........................ 428/461; 428/458; 428/704; 428/689; 428/480; 428/425.8; 428/420; 428/419; 428/418; 428/500; 428/515

(58) Field of Search .............................. 428/458, 704, 428/689, 480, 425.8, 420, 419, 418, 461, 500, 515

(56) References Cited

U.S. PATENT DOCUMENTS 3,837,964 * 9/1974 Cotton et al. .
4,428,987 * 1/1984 Bell et al. .
4,500,601 * 2/1985 Whitcomb .
4,812,363 * 3/1989 Bell et al. .
5,085,916 * 2/1992 Wilhelm et al. .
5,112,428 * 5/1992 Correa et al. .
5,243,047 * 9/1993 Lawson .
5,316,810 * 5/1994 Rogerson .
5,360,492 * 11/1994 Gray .
5,569,545 * 10/1996 Yokono et al. .
5,822,799 * 3/1999 Roseboom et al. .
5,874,513 * 2/1999 Watanabe et al. .
5,874,784 * 2/1999 Aoki et al. .

FOREIGN PATENT DOCUMENTS 1 463 128 2/1977 (GB) .
63-264807 * 11/1988 (JP) .
07316425 * 12/1995 (JP) .
08187799 7/1996 (JP) .
11054936 * 2/1999 (JP) .

* cited by examiner

*Primary Examiner*—Deborah Jones
*Assistant Examiner*—Wendy Boss
(74) *Attorney, Agent, or Firm*—Akin, Gump, Strauss, Hauer & Feld, L.L.P.

(57) ABSTRACT

An electrically insulating film capable of maintaining a preferable insulating property even with a film thickness of only some μand a method for preparing the same are disclosed. The insulating film comprises a first layer formed on a surface of a conductor substrate of a transition metal and comprised of molecules fixed on the surface of the conductor substrate through chemical bonds such as transition metal-sulfur bonds or chelate bonds, and a second layer formed on the first layer and comprised of a resin bonded to the molecules of the first layer through covalent bonds.

4 Claims, 1 Drawing Sheet

INSULATING FILM AND METHOD FOR PREPARING THE SAME

BACKGROUND OF THE INVENTION

The present invention relates to an electrically insulating film, particularly an insulating film to be formed on a surface of a conductor substrate, and a method for preparing the same.

Hitherto, the surfaces of conductors have been treated by applying a tape made of a resin on them, or coating them with a resin layer, in order to secure an insulating property of the surfaces of conductors. When a thin insulating film is required, for instance, it is produced by applying a precursor of a resin on the surface of a conductor and baking it with heat as represented by varnish treatment for enamel wires.

With the recent miniaturization of portable electronic appliances, designs of electronic components and motors are directed to their smaller and thinner sizes, and their smaller power consumptions commensurate with the miniaturization of electronic appliances, and thus thinner insulating films are now being required.

However, the insulating film obtained by the above-mentioned surface treatment with a resin tape generally has an insufficient thickness of only not less than dozens of μm due to restricted durability and workability of the resin tape. On the other hand, varnish-coated films for enamel wire can be reduced in thickness, but, when the thickness is reduced to some μor less, they easily develop pinholes and lose their insulating property. Similarly, if treated by the method of high speed winding as is often used for production of motor coils, the insulating film loses its insulating property due to possible extension and bending of enamel wire during the winding process, and its withstand voltage per μdrops to about 500 V.

The above phenomenon may be explained that the resin constituting the insulating film is bonded to the surface of metal only mechanically and is easily separated or transferred by an external force.

BRIEF SUMMARY OF THE INVENTION

It is therefore the primary object of the present invention to provide a strong insulating film which secures a satisfactory insulating property even with a film thickness of only some μand is resistant to stresses imposed during the high speed winding process.

It is another object of the present invention to provide a method for preparing such insulating film with reasonable means.

The present invention provides an electrically insulating film comprising:

a first layer formed on a surface of a conductor substrate of a transition metal, the first layer being comprised of molecules fixed on the surface of the conductor substrate through transition metal-sulfur bonds represented by the formula (1) or chelate bonds selected from the groups represented by the formula (2)

(2)

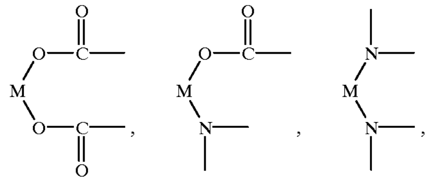

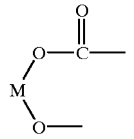

or

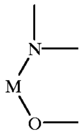

where M represents the transition metal and S represents sulfur, and a second layer formed on the first layer and comprised of a resin combined with the molecules of the first layer through covalent bonds.

The present invention also provides a method for preparing the insulating film which comprises the steps of:

contacting a compound capable of firmly combining with a conductor through chemical bonds (hereinafter referred to as "anchor compound") with a substrate, thereby to fix the anchor compound to the surface of the substrate at a high density, and forming a resin layer on the anchor compound, thereby to bind the resin to the anchor compound through covalent bonds.

Since the insulating film in accordance with the present invention is fixed to the surface of the metal through the chemical bonds, pinholes are most unlikely to develop on the film even when the thickness is reduced, and the resultant film can have a favorable insulating property. Such film can therefore be preferably available as the insulating film for the electronic components and motors. It can also be available as a dielectric film for capacitors.

According to the method in accordance with the present invention, the above-mentioned insulating film can be produced with reasonable means.

While the novel features of the present invention are set forth particularly in the appended claims, the invention, both as to organization and content, will be better understood and appreciated, along with other object and features thereof, from the following detailed description and examples,

DETAILED DESCRIPTION OF THE INVENTION

Figure 1:
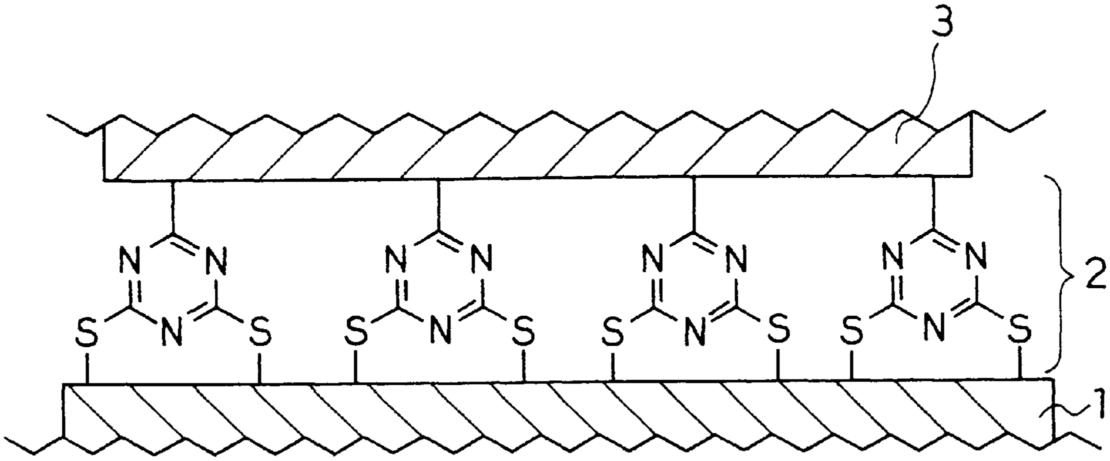
FIG. 1 is a schematic view showing a structure of the insulating film in accordance with one embodiment of the present invention.

If the resin constituting the insulating film itself is firmly fixed to the surface of the conductor, pinholes hardly develop and it is possible to prevent the occurrence of separation or tear of the insulating film even when the stresses, such as extension or bending, are imposed on the insulating film. The present invention is completed by focusing attention on this particular point. In this description, the "conductor" designates a substance having electric conductivity such as metals and tin oxides.

The insulating film in accordance with the present invention is constituted by fixing a compound which firmly combines with the conductor through chemical bonds to the surface of the conductor at a high density, and making the resin layer firmly adhere to the compound through covalent bonds.

Preferable anchor compounds are roughly classified into three groups. A first group includes thiol compounds, a second group includes triazine compounds, and a third group includes compounds with a functional group capable of forming a chelate bond.

The thiol compounds are compounds having a mercapto group or its alkali metal salt moiety, and may suitably be exemplified as 1,2-dimercaptoethane, 1,6-dimercaptohexane, 1,16-dimercaptohexadecane, 2-mercaptoethanol, 6-mercaptohexanol, 16-mercaptohexadecanol, 4-mercaptostyrene, 3,4-dimercaptostyrene, 6-mercaptohexene, 5-amino-1,3,4-thiadiazole-2-thiol, 2-amino-benzoimidazole and the like.

The triazine compounds are compounds with a functional group of triazine skeleton represented by the formula:

(3)

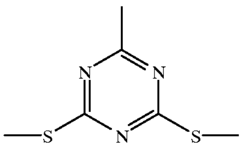

and are preferably compounds represented by the formula:

(6)

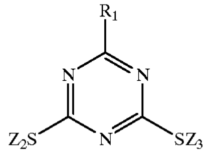

or

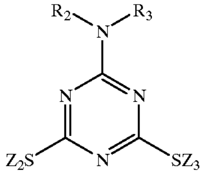

where $R_1$ represents a hydrogen atom, a mercapto group, a hydroxyl group, an alkyl group having 1 to 8 carbon atoms, a phenyl group or a benzyl group, $R_2$ and $R_3$ independently represent a hydrogen atom, an alkyl group having 1 to 8 carbon atoms, a phenyl group or a benzyl group, and $Z_2$ and $Z_3$ independently represent a hydrogen atom or an alkali metal.

The compounds may suitably be exemplified as 1,3,5-triazine- 2,4,6-trithiol, 1,3,5-triazine-2,4,6-trithiol-monosodium, 1,3,5-triazine-2,4,6-trithiol-disodium, 1,3,5-triazine-2,4,6-trithiol-trisodium, 6-allyl-1,3,5-triazine-2,4-dithiol, 6-amino-1,3,5-triazine-2,4-dithiol, 6-methylamino-1,3,5-triazine-2,4-dithiol, 6-octylamino-1,3,5-triazine-2,4-dithiol, and the like.

The compounds with a functional group capable of forming a chelate bond are compounds with the functional group represented by the formula;

(4)

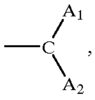

,

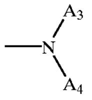

or

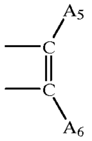

where $A_1$ to $A_6$ are $(CH_2)_nCOOZ$ (n represents an integer of 0 to 3, Z represent a hydrogen atom or a metal atom) or $(CH_2)_mNXY$ (m represents an integer of 0 to 2, X and Y independently represent a hydrogen atom, an alkyl group having 1 to 8 carbon atoms, a phenyl group or a benzyl group), and the double bond in the formula (4) may be a part of a benzene ring or another aromatic ring.

The compounds with the functional group capable of forming a chelate bond may suitably be exemplified as anthranilic acid, itaconic acid, citraconic acid, maleic acid, 4-hydroxyanthranilic acid, 4-vinylanthranilic acid, 2,5-diaminobenzoic acid, pyromellitic acid and the like.

Of these anchor compounds included in the above-mentioned three groups, the most suitable one for preparing the insulating film depends on the species of the metal for constituting the conductor and the performance required for the insulating film.

If the conductor is gold or silver, the thiol compound can be fixed thereto at the highest density, and if the conductor is copper or nickel, the triazine compound is most suitable. With most of the other metals, the compounds with the functional group capable of forming the chelate bonds are suitable in most cases.

In addition, if these anchor compounds include an unsaturated group, a mercapto group, a disulfide bond, an amino group, an alkoxysilyl group, a glycidyl group, a carboxyl group, a hydroxyl group, an aldehyde group and the like as represented by the formula (5) in their molecules, it is possible to form the covalent bonds with the resin to be bonded thereto, thereby to fix the resin firmly.

(5)

$-NR-$ ,

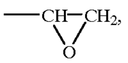

,

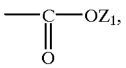

, $-OH$ or

where $Z_1$ represents a hydrogen atom or an alkali metal. R represents a hydrogen atom or an alkyl group having 1 to 3 carbon atoms.

Of these functional groups, the most preferable one depends on the molecular structure of the resin. If the resin is prepared from its precursor which contains an unsaturated group, it is preferable that the anchor compound contains an unsaturated group, a mercapato group or a disulfide bond. If the resin is prepared from its precursor which contains an amino group, it is preferable that the anchor compound contains an alkoxysilyl group, a carboxyl group or an aldehyde group. If the resin is prepared from its precursor which contains a carboxyl group, then it is preferable that the anchor compound contains an amino group or a hydroxyl group.

Preferable examples of the combinations of the resin with the anchor compound are a combination of the epoxy resin with 1,3,5-triazine-2,4,6-trithiol, 6-amino-1,3,5-triazine-2,4-dithiol, 1,6-dimercaptohexane or 2,5-diaminobenzoic acid.

For the polyester resin or the polyester imido resin, a combination with 1,3,5-triazine-2,4,6-trithiol, 6-amino-1,3,5-triazine-2,4-dithiol, 1,6-dimercaptohexane, 2,5-diaminobenzoic acid, 6-mercaptohexanol, 4-hydroxyanthranilic acid or pyromellitic acid is preferable.

The method for preparing the insulating film in accordance with the present invention is one in which the anchor compound is brought into contact with a conductor substrate to fix the anchor compound to the surface of the substrate at a high density, and then a resin layer is formed thereon to bind the resin with the anchor compound through the covalent bonds.

Suitable means for fixing the anchor compound to the surface of the substrate is to immerse the conductor substrate in a solution produced by diluting the anchor compound with a suitable solvent, or to apply the solution on the conductor substrate.

Any solvent capable of dissolving the anchor compound may be used. For this purpose, water, methanol, ethanol, propanol, acetone, tetrahydrofuran, chloroform or toluene may suitably be used in general. The concentration of the solution depends on the species of the conductor metal, the species of the anchor compound and the treatment time. If the anchor compound is one that is liable to react with the metal, the concentration may be low, but if the reactivity of the anchor compound with the metal is poor, or short-time treatment is required, the concentration must be high. Typically, a concentration from about 0.1 wt % to about 5 wt % is preferable.

If the vapor pressure of the anchor compound is high, it is possible to fix the anchor compound simply by placing the substrate in a sealed container accommodating the anchor compound because the vapor of the anchor compound easily reaches the surface of the substrate.

Thereafter, a resin layer is formed on the substrate of which surface is fixed with the anchor compound. Ordinary means for forming the resin layer is to place the precursor of the resin on the surface of the above-mentioned substrate and to resinify the precursor by heat treatment or the like. The precursor of the resin is a monomer of the resin or a prepolymer of a thermosetting resin before curing.

If one of these resin can be fluidified by dissolving it in a solvent, the precursor is diluted with a suitable solvent and applied on the surface of the substrate. Any solvent capable of dissolving the precursor of the resin may preferably be used. Such solvent may be exemplified as methanol, ethanol, propanol, acetone, tetrahydrofuran, chloroform, toluene, xylene, a glycol ether, cresol, N,N-dimethyl formamide, dimethyl sulfoxide, N-methylpyrrolidone, phenol and the like.

The concentration of the solution depends upon the species of the resin and the intended thickness of the insulating film to be prepared. When a thin insulating film is desired or the viscosity of the precursor of the resin is high, the concentration is desirably low. In contrast, when a thick film is desired or the viscosity of the precursor is low, the concentration is desirably high.

Particularly if a monomer of the resin is used, the viscosity of the monomer itself is often not more than 20 centipoise and the monomer can be applied as it is without diluting it with a solvent.

Furthermore, if the resin is fluidified with heat, the fluidified resin can be used as the precursor of the resin.

In order to resinify the precursor of the resin applied on the substrate, heat treatment is often applied. The temperature and time period of heating depends upon the species of the precursor of the resin, but if a polyester-imido resin is used, it can be resinified completely at 400° C. for 30 seconds.

If the precursor of the resin has a photo-curing property, it may be resinified by means of ultraviolet irradiation.

In the following paragraphs, the present invention will be described in more detail, referring to specific examples.

EXAMPLE 1

A test piece was prepared from a copper plate with a thickness of 1 mm by cutting it to a square of 3 cm.

After washing with 1N dilute hydrochloric acid, this test piece was immersed in a 1 wt % ethanol solution of 1,3,5-triazine-2,4,6-trithiol for 5 minutes. Thereafter, the test piece was picked up from the solution and dried, and then applied with a polyester imido paint (available from DAIICHI DENKO Co., Ltd.) using a roll coater and heated at 300° C. for 10 minutes. The thickness of the obtained film was 1 $\mu$m.

A schematic view of the obtained film is shown in FIG. 1. Numeral 1 designates a conductor substrate. A first layer 2 composed of a triazine compound is fixed to the conductor substrate 1 through conductor metal-sulfur bonds. On the first layer 2 of the above-mentioned triazine compound, a second layer 3 composed of a resin is fixed through covalent bonds.

On the film composed of the first layer 2 and the second layer 3, a gold electrode having an area of 1 $cm^2$ was vapor-deposited, and the insulation resistance between the copper substrate and the gold electrode measured was $5.6\times10^8$ Ω(volume resistance of the film was $5.6\times10^{12}$ Ωcm).

EXAMPLE 2

A test piece was prepared by cutting a copper plate in a manner similar to that in Example 1. After washing with 1N dilute hydrochloric acid, this test piece was immersed in a 1 wt % ethanol solution of 1,3,5-triazine-2,4,6-trithiol for 5 minutes. Thereafter, the test piece was picked up from the solution, washed with ethanol and dried, and then applied with a one-third metacresol-diluted product of a polyester imido paint (available from DAIICHI DENKO Co., Ltd.) using a spin-coating process and heated at 300° C. for 10 minutes. The thickness of the obtained film was 0.1 $\mu$m.

A measurement of the insulation resistance between the copper substrate and the gold electrode conducted in a manner similar to that in Example 1 revealed that it was $2.3\times10^7$ Ω(volume resistance of the film was $2.3\times10^{12}$ Ωcm).

EXAMPLE 3

In this specific example, a product made by vapor-depositing a gold layer on a slide glass in about 100 nm thickness was used as a test piece. The test piece was immersed in a 1 wt % ethanol solution of 1,6—dimercaptohexane for 5 minutes. Thereafter, the test piece was picked up from the solution, washed with ethanol and dried, and then applied with a polyamide varnish (available from Hitachi Chemical Co., Ltd.) using a roll coater and heated at 300° C. for 10 minutes. The thickness of the obtained film was 1 $\mu$m.

On the film, a gold electrode having an area of 1 $cm^2$ was vapor-deposited, and the insulation resistance between the gold layer on the slide glass and the gold electrode measured was $8.6\times10^8$ Ω(volume resistance of the film was $8.6\times10^{12}$ Ωcm).

EXAMPLE 4

A test piece was prepared from a nickel plate with a thickness of 1 mm by cutting it to a square of 3 cm. After washing with 1N dilute hydrochloric acid, this test piece was immersed in a 1 wt % tetrahydrofuran solution of pyromellitic acid for 5 minutes. Thereafter, the test piece was picked up from the solution, washed with tetrahydrofuran and dried, and then applied with a polyester imido paint (available from DAIICHI DENKO Co., Ltd.) using a roll coater and heated at 300° C. for 10 minutes. The thickness of the obtained film was 1 μm.

On the film, a gold electrode having an area of 1 $cm^2$ was vapor-deposited, and the insulation resistance between the nickel substrate and the gold electrode measured was $3.2\times10^8$ Ω(volume resistance of the film was $3.2\times10^{12}$ Ωcm).

EXAMPLE 5

As in Example 3, a product made by vapor-depositing a gold layer on a slide glass was used as a test piece. It was immersed in a 1 wt % toluene solution of 4-mercaptostyrene for 5 minutes. Thereafter, the test piece was picked up from the solution, washed with toluene and dried, and then applied with styrene by a spin-coating process and irradiated with ultraviolet ray for 10 minutes using a low-pressure mercury-lamp. The thickness of the obtained film was 0.1 μm.

On the film, a gold electrode having an area of 1 $cm^2$ was vapor-deposited and the insulation resistance between the gold layer on the slide glass and the gold electrode measured was $4.1\times10^8$ Ω(volume resistance of the film was $4.1\times10^3$ Ωcm).

COMPARATIVE EXAMPLE 1

A test piece was prepared by cutting a copper plate in a manner similar to that in Example 1. After washing with 1N dilute hydrochloric acid, this test piece was applied with a polyester imido paint (available from DAIICHI DENKO Co., Ltd.) using a roll-coater and heated at 300° C. for 10 minutes. The thickness of the obtained film was 1 μm.

A measurement of the insulation resistance between the copper substrate and the gold electrode conducted in a manner similar to that in Example 1 revealed that it was $7.8\times10^7$ Ω(volume resistance of the film was $7.8\times10^{11}$ Ωcm).

COMPARATIVE EXAMPLE 2

A test piece was prepared by cutting a copper plate in a manner similar to that in Example 1. After washing with 1N dilute hydrochloric acid, this test piece was applied with a one-third diluted product of a polyester imido paint (available from DAIICHI DENKO Co., Ltd.) by a spin-coating process and heated at 300° C. for 10 minutes. The thickness of the obtained film was 0.1 μm.

A measurement of the insulation resistance between the copper substrate and the gold electrode conducted in a manner similar to that in Example 1 revealed that it was $3.8\times10^5$ Ω(volume resistance of the film was $3.8\times10^{10}$ Ωcm).

From the results of the foregoing specific examples and comparative examples, it is demonstrated that the insulating film in accordance with the present invention is far higher in electric resistance and better in insulating property than those obtained by a conventional process.

Although the present invention has been described in terms of the presently preferred embodiments, it is to be understood that such disclosures are not to be interpreted as limiting. various alterations and modifications will undoubtedly become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. An electrically insulating film comprising:

a first layer formed on a surface of a conductor substrate of a transition metal, said first layer consisting essentially of monomer molecules fixed on the surface of said conductor substrate through transition metal-sulfur bonds represented by the formula (1)

$$M—S— \quad (1)$$

wherein M represents the transition metal and S represents sulfur, and a second layer formed on said first layer and comprised of a resin bonded to the molecules of said first layer through covalent bonds.

2. The electrically insulating film in accordance with claim 1, wherein said molecules comprise a thiol compound.

3. The electrically insulating film in accordance with claim 1, wherein said molecules comprise a triazine compound having a functional group represented by the formula (3)

(3)

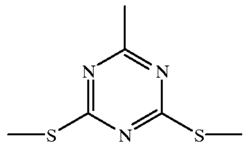

4. An electrically insulating film comprising:

a first layer formed on a surface of a conductor substrate of a transition metal, said first layer being comprised of molecules fixed on the surface of said conductor substrate through chelate bonds selected from the groups represented by the formula (2)

(2)

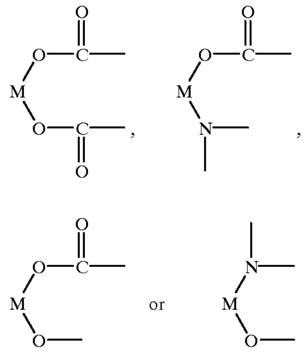

wherein M represents the transition metal, and a second layer formed on said first layer and comprised of a resin bonded to the molecules of said first layer through covalent bonds.

* * * * *